(12) United States Patent
Baquet et al.

(10) Patent No.: US 10,760,326 B2
(45) Date of Patent: Sep. 1, 2020

(54) INSULATING GLAZING WITH GLASS SPACER, NOTABLY FOR CLIMATE-CONTROLLED UNIT

(71) Applicant: SAINT-GOBAIN GLASS FRANCE, Courbevoie (FR)

(72) Inventors: Erwan Baquet, Compiegne (FR); Romain Decourcelle, Margny les Compiegne (FR); Edouard Jonville, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 20 days.

(21) Appl. No.: 16/085,846

(22) PCT Filed: Feb. 23, 2017

(86) PCT No.: PCT/EP2017/054179
§ 371 (c)(1),
(2) Date: Sep. 17, 2018

(87) PCT Pub. No.: WO2017/157636
PCT Pub. Date: Sep. 21, 2017

(65) Prior Publication Data
US 2019/0100958 A1    Apr. 4, 2019

(30) Foreign Application Priority Data
Mar. 18, 2016 (FR) ..................... 16 52348

(51) Int. Cl.
*E06B 3/663* (2006.01)
*B32B 7/12* (2006.01)
(Continued)

(52) U.S. Cl.
CPC .......... *E06B 3/66333* (2013.01); *B32B 7/12* (2013.01); *B32B 17/06* (2013.01);
(Continued)

(58) Field of Classification Search
CPC ............ E06B 3/66333; E06B 3/67326; E06B 3/66342; E06B 3/66366; E06B 3/6715;
(Continued)

(56) References Cited

U.S. PATENT DOCUMENTS

| 2012/0090253 A1* | 4/2012 | Beresford | E06B 3/66333 52/204.593 |
| 2015/0079313 A1* | 3/2015 | Vogel-Martin | E06B 3/66304 428/34 |
| 2016/0120336 A1* | 5/2016 | Schneider | A47F 3/005 312/116 |

FOREIGN PATENT DOCUMENTS

| EP | 2 456 942 A1 | 5/2012 |
| WO | WO 2010/119067 A1 | 10/2010 |
| WO | WO 2014/198549 | * 12/2014 |

OTHER PUBLICATIONS

International Search Report as issued in International Patent Application No. PCT/EP2017/054179, dated Apr. 24, 2017.

* cited by examiner

*Primary Examiner* — Donald J Loney
(74) *Attorney, Agent, or Firm* — Pillsbury Winthrop Shaw Pittman LLP

(57) ABSTRACT

An insulating glazing includes two glass sheets spaced apart by at least one air- or gas-filled cavity, at least one transparent spacer made of glass, which is arranged at a periphery of the glass sheets and which keeps the two glass sheets spaced apart, and a transparent fastening system to fasten by adhesive bonding, which fastens the spacer to each glass sheet via two opposite fastening faces of the spacer, wherein the spacer made of glass is obtained by the cutting of glass sheet in a raw state, and is joined to the glass sheets directly in the raw state, and wherein the fastening system to fasten by adhesive bonding consist of a transparent material having (Continued)

been placed at an external junction of the spacer and of the glass sheets and having flowed into asperities of the glass of the fastening faces of the spacer.

21 Claims, 2 Drawing Sheets

(51) Int. Cl.
*B32B 17/06* (2006.01)
*B32B 38/00* (2006.01)
A47F 3/04 (2006.01)
E06B 3/673 (2006.01)

(52) U.S. Cl.
CPC ........ *B32B 38/0004* (2013.01); *A47F 3/0434* (2013.01); *B32B 2307/304* (2013.01); *B32B 2307/412* (2013.01); *B32B 2307/7246* (2013.01); *B32B 2307/7265* (2013.01); *B32B 2419/00* (2013.01); *E06B 3/66304* (2013.01); *E06B 3/66342* (2013.01); *E06B 3/67326* (2013.01); *E06B 2003/66338* (2013.01); *Y02B 80/22* (2013.01)

(58) Field of Classification Search
CPC ........... E06B 2003/66338; Y02B 80/22; A47F 3/0434
See application file for complete search history.

INSULATING GLAZING WITH GLASS SPACER, NOTABLY FOR CLIMATE-CONTROLLED UNIT

CROSS-REFERENCE TO RELATED APPLICATIONS

This application is the U.S. National Stage of PCT/EP2017/054179 filed Feb. 23, 2017, which in turn claims priority to French patent application number 1652348 filed Mar. 18, 2016. The content of these applications are incorporated herein by reference in their entireties.

The invention relates to an insulating glazing intended for a door of a climate-controlled, and in particular refrigerated, unit/enclosure, said door comprising at least two glass sheets, which are spaced apart by at least one air- or gas-filled cavity by virtue of at least one spacer that is arranged at the periphery of the glass sheets, at least one transparent spacer made of glass being placed on one of the sides of the glazing.

The invention also relates to a process for manufacturing such a glazing.

The invention will more particularly be described with regard to an application to a refrigerated unit/display window, without however being limited thereto. The glazing of the invention may be used in any architectural application, any exterior-glazing application, any interior-glazing application, any partitioning application, etc.

Among spacers, there are spacers made of synthetic material, spacers made of organic material and spacers made of glass.

The present invention relates exclusively to spacers made of glass.

A climate-controlled enclosure is more particularly intended to form a chiller unit (temperature above 0° C.) or freezer unit (temperature below 0° C.) in which chilled or frozen products are respectively displayed, these products possibly being items of food or drinks or any other products that need to be kept cold—pharmaceutical products or flowers for example.

Although frozen products are increasingly being sold in units provided with what are called "cold" doors, comprising transparent insulating glazings, at the present time self-service fresh and ultra-fresh items of food are essentially sold by means of vertical units that are open-fronted. Provided at the front with a curtain of refrigerated air in order to isolate the items of food from the warmer ambient environment of the store and to keep the items of food at their optimal preservation temperature, these open-fronted units are quite effective from this point of view and, in the absence of physical barrier, allow products to be accessed directly, facilitating the act of purchase.

However, the absence of physical barrier in these vertical chilled units leads to substantial heat exchange between the ambient environment of the store and the much colder environment inside these units, this having the following consequences:

this heat exchange must be compensated for by greater refrigeration in order to guarantee temperatures that are optimal for the preservation of food in the unit, this disadvantageously increasing the power consumption of these units;

the ambient environment of the store is considerably cooled locally (cold-aisle effect), this leading to consumers avoiding venturing into these aisles except for essential purchases, reducing impulse buying. This local cooling of the aisles in question has grown worse over the last few years as the strictness of food-safety regulations has increased and led to the temperature of preservation of foodstuffs being further decreased;

moist air from the ambient environment of the store is drained by the cold-air curtain of the open-fronted unit, this leading to a rapid saturation of the unit's heat exchanger (also called an evaporator) which ices up, significantly decreasing the efficiency of the heat exchange. It is therefore necessary to frequently de-ice the evaporator, typically two times per day, this leading to an increased power consumption and generating costs.

Confronted with these drawbacks, unit manufacturers have attempted to provide solutions, in particular involving optimizing the air curtains and heating the aisles with radiant heaters or hot-air blowers. The progress made with respect to customer comfort nevertheless remains limited, and is to the detriment of power consumption. Specifically, the heat produced by these heating systems, which guzzle power, also heats the units, and thereby leads in the end to even more power being consumed to refrigerate these units.

Providing these open-fronted units with conventional cold doors allows these drawbacks to be effectively addressed. However, these solutions, which are tried and tested in freezer units for frozen products, have been slow to be adopted in chiller units. These doors have the disadvantage of placing a physical barrier between the consumer and the self-service product, possibly having potentially negative consequences on sales.

Furthermore, these doors are manufactured to a design similar to that of the windows used in buildings: a frame made of profiles, generally made of anodized aluminum for reasons of aesthetics, resistance to aging and ease of manufacture, frames the entire periphery of a double or triple glazing. The frame is generally adhesively bonded directly to the periphery and to the external faces of the glazing; it participates in the rigidity of the structure and allows the interlayer means (spacers) placed at the periphery of the glazing and separating the glass sheets to be masked from sight.

However, such a structural frame significantly decreases the vision area of the glazing.

It has thus been proposed, to improve the vision area of glazings, to manufacture insulating glazings with spacers that are transparent at least on their vertical sides, furthermore creating the visual perception that refrigerated windows placed side-by-side form a continuous transparent area.

At the present time, the process used to manufacture a glazing with a glass spacer involves cutting a glass sheet of square or rectangular cross section and a large thickness of about 15 mm (in particular of 14.7 mm). The term "thickness" is understood, in the rest of the description, to mean the dimension measured in a plane parallel to the general surfaces of the glass sheets in the mounted position of the spacer, i.e. the dimension measured from the edge face of the glass sheets toward the interior of the glazing.

As for the "width" of the spacer, it corresponds to the dimension separating the two glass sheets in the mounted position of the spacer.

Generally, it will be recalled that there are various techniques for cutting glass:

the most commonplace technique combines scoring, for example with a diamond roller, and breakage; this technique is used for glass panes of 1 to 19 mm thickness;

the waterjet-cutting technique, which allows glass panes of larger thicknesses to be cut;

the laser-cutting technique, which allows perfectly clean cutting but which is not widely industrialized and is not used in the manufacture of insulating glazings because it is too expensive.

Cutting by scoring/breakage has the drawback of generating chips, meaning that the surface finish of the cut edge face is neither clean nor smooth.

However, to prevent visual distortion in an insulating glazing with one or more glass spacers, at the interface of the joints between the spacer and the glass sheets, the faces of the spacer that are securely fastened to the glass sheets must have a perfectly smooth surface finish.

Furthermore, the breakage creates, in particular at the start and end of the cutting line, a slight obliqueness in the edge face of the cut glass; the edge face is not perfectly orthogonal to the planes of the general faces of the cut glass sheet. The angle made by the oblique generatrix of the cut edge face to the plane orthogonal to the general faces of the glass is called the cutting angle, which is therefore in fact different from 90°. This cutting angle is not envisionable in the case of a conventional spacer made of glass of 15 mm thickness as the surfaces to be securely fastened to the glass sheets must be perfectly parallel to the glass sheets.

Thus, present-day spacers made of glass for insulating glazings are obtained using the waterjet-cutting technique, so as to guarantee the surfaces to be associated with the glass sheets are perfectly parallel to the glass sheets (and therefore that these surfaces are perfectly orthogonal to the other faces of the spacer).

However, this waterjet-cutting technique has a few drawbacks:

it requires a specific thickness of glass to be manufactured upstream, i.e. a thickness of 15 mm (and more precisely of 14.7 mm);

it is complex to control, takes time and employs specific technical means within a working environment that must furthermore be suitable for these means;

it generates a rough surface finish due to marks left by the jet; the cut faces of the spacer are placed adjacent the edge face of the glazing and the gas-filled cavity, because the other faces, i.e. the faces that were not cut, are the faces intended to be associated with the glass sheets, because their surface is perfectly smooth. However, the rough faces, i.e. the faces that are located transversely to the glass sheets, give the glass surface a matte appearance, preventing the desired transparency effect from being achieved when the glazing is looked at from a slightly oblique angle.

The aim of the invention is therefore to provide, in particular for a climate-controlled unit, an insulating glazing that obviates the various aforementioned drawbacks, this being achieved by choosing a spacer made of glass that facilitates the process of manufacturing the spacer and the insulating glazing obtained therewith, that allows the vision area of the glazing to be further increased while ensuring the desired seal-tightness is achieved, and that has the additional advantage of further decreasing thermal bridges.

According to the invention, the insulating glazing, which is intended for a door of a climate-controlled, and in particular refrigerated, unit/enclosure, comprises at least two (substantially parallel) glass sheets, which are spaced apart by at least one air- or gas-filled cavity, at least one transparent spacer made of glass, which is arranged at the periphery of the glass sheets and which keeps the two glass sheets spaced apart and parallel, and transparent means for fastening by adhesive bonding, which fasten the spacer to each glass sheet via two of its opposite faces, which faces are called fastening faces, and is characterized in that the spacer made of glass is obtained by the cutting of glass sheet in the raw state, and is joined to the glass sheets directly in the raw state, and in that the means for fastening by adhesive bonding consist of a transparent material having been placed at the external junction of the spacer and of the glass sheets and having flowed into the asperities of the glass of the fastening faces of the spacer.

Since the spacer is obtained by the cutting of glass sheet in the raw state, it has a square or rectangular cross section (no bevel).

The spacer made of glass has a thickness smaller than 8 mm or than 10 mm, and in particular a thickness comprised between 4 and 6 mm.

According to the invention, the insulating glazing, which is intended for a door of a climate-controlled, and in particular refrigerated, unit/enclosure, comprises at least two (substantially parallel) glass sheets, which are spaced apart by at least one air- or gas-filled cavity, at least one transparent spacer made of glass, which is arranged at the periphery of the glass sheets and which keeps the two glass sheets spaced apart and parallel, and transparent means for fastening by adhesive bonding, which fasten the spacer to each glass sheet via two of its opposite faces, which faces are called fastening faces, and is characterized in that the spacer made of glass has a thickness smaller than 8 mm or 10 mm, and in particular a thickness comprised between 4 and 6 mm, and in that the means for fastening by adhesive bonding consist of a transparent material placed at the external junction of the spacer and of the glass sheets and having flowed into any asperities of the glass of the fastening faces of the spacer.

The term "external" is understood, in the rest of the description, to mean that which is exterior to the volume making contact with the gas-filled cavity, this volume in contrast being qualified "internal".

The term "transparent" in the expression "transparent spacer" is understood to mean allowing at least colors and shapes to be seen therethrough, it not necessarily being possible to read a text behind the transparent spacer.

Advantageously, the spacer is obtained by the cutting of glass sheet in the raw state, and is joined to the glass sheets directly in the raw state. Cutting is said to be in the "raw state" if it has not undergone any polishing or any other mechanical action to change its surface finish. In particular, the spacer made of glass undergoes no additional cutting step such as a step of beveling the spacer.

The cutting is carried out using a technique other than the waterjet-cutting technique.

Such a small spacer thickness allows the visual impact of the spacer to be very greatly limited.

The expression "a small spacer thickness" is understood to be meant with respect to the large thicknesses of the prior art, i.e. 12 mm or more. A thickness of 12 mm or more requires waterjet cutting, which is absolutely not the case with the invention. On the contrary, the invention uses a small thickness, and therefore a thickness smaller than the thickness of the prior art, in particular smaller than 10 mm, a thickness smaller than 10 mm being cutable by laser or by scoring-breakage.

Furthermore, since the thickness of the spacer is small, its mass is also decreased, thereby creating a much smaller thermal bridge than with a conventional prior-art spacer.

Moreover, despite the small spacer thickness, the spacer combined with the presence of the adhesive-bonding material not only at the junction line between the spacer and the glass sheets, but also in the asperities in the fastening faces of the glass of the spacer, ensure the mechanical strength required with respect to the risks of shocks that the insulating glazing could undergo. The bonding material has a strength tailored to the tensile stress, preferably the bonding material is able to resist tensile stresses higher than 2.2 MPa.

The glazing does not necessarily comprise a uniform adhesive-bonding interface layer between the fastening faces of the spacer and the glass sheets, because the adhesive-bonding means chosen allow surface defects in the glass, which are created during the cutting, to be filled, and spread sufficiently to ensure fastening is achieved.

According to one feature, the spacer made of glass is obtained by a cutting of glass, in particular of float glass, of thickness smaller than 8 or 10 mm, the cutting preferably being made using the scoring-breakage technique, or even by laser cutting.

The glass of the spacer is preferably monolithic.

According to another feature, the spacer made of glass is obtained by the cutting of glass the thickness of which is the same as that of the constituent glass sheets of the glazing.

Therefore, the upstream step of producing the spacer made of glass is simple, conventional, and carried out under the same conditions as the step of producing the glass sheets, and therefore does not require the complex means of the prior art, which for example employ waterjet cutting.

The spacer made of glass of the invention is used and arranged between the glass sheets via its fastening faces, which correspond to its cut edge faces, in the raw state after cutting without any finishing steps such as a step of polishing said edge faces, the means for fastening, by adhesive bonding, the spacer to the glass sheets advantageously filling the asperities and planarity defects in the cut glass edge faces.

Unexpectedly, the inventors have demonstrated that a thin spacer made of glass, combined with adhesive-bonding means having flowed into the asperities of the fastening faces, is enough to ensure the spacer is fastened to the glass sheets, and above all that the transparent adhesive-bonding means, by filling the asperities, ensure a continuity in the refractive optical index of the spacer/adhesive-bonding-means assembly, negating the visual impact of the asperities and defects present in the fastening faces and created by cutting, in particular cutting by scoring-breakage.

According to another feature, the means for fastening by adhesive bonding consist of a transparent adhesive-bonding material having a refractive index that is identical or close to that of the glass, thereby guaranteeing the continuity in refractive index through the glass sheets, spacer and adhesive-bonding means, achieving, for an individual looking at the glazing, or even a plurality of glazings placed side-by-side, at a slightly oblique angle, a continuity in transparency without visual distortion.

The expression "close to that of the glass" is understood to mean, with respect to refractive index, a tolerance of plus or minus 30% with respect to the refractive index of the glass.

The transparent adhesive-bonding material is a material that optionally crosslinks under ultraviolet (UV), preferably rapidly (at most a few minutes).

The transparent adhesive-bonding material has a viscosity that enables it to disperse, by capillary action, into the asperities present in the glass of the cut faces of the spacer, preferably a viscosity comprised between 300 mPa·s and 900 mPa·s, and preferably of about 600 mPa·s.

Advantageously, the transparent adhesive-bonding material is chosen to also form a barrier that is seal-tight at least to water, and preferably to water and to gases and water vapor, and in particular is made of an acrylate resin or epoxy resin.

By way of preferred example, the transparent adhesive-bonding material is an acrylate resin, such as the adhesive UV Verifix B 678 sold by the company BOHLE, which is crosslinkable under UV. This adhesive has a medium viscosity (600 mPa·s) and has good properties in terms of capillarity and seal-tightness to water, and to gases and water vapor.

The means for fastening by adhesive bonding have a thickness at the external junction line of the spacer and of each glass sheet of a few microns to 1 mm and preferably of a few microns to 0.5 mm at most.

The invention also relates to a process for manufacturing an insulating glazing according to the invention, comprising a step of producing the spacer and a step of joining the spacer to the glass sheets, characterized in that the producing step consists in cutting at least one glass strip of width equivalent to that required to separate the glass sheets (for example of 12, 15 or 20 mm width), from a glass substrate of thickness smaller than 8 or 10 mm, and in particular of thickness comprised between 4 and 6 mm, and associating, preferably in the raw state, this glass strip, via the cut edge faces, with the glass sheets, with adhesive-bonding means the material of which is able to flow into the interface between said cut edge faces of the spacer and the glass sheets, and into the asperities of the glass of the cut edge faces.

According to one feature, the producing step comprises cutting a plurality of glass strips. These glass strips will be used in the same glazing or in a plurality of glazings.

According to one feature, the joining step comprises placing a glass sheet flat, applying one of the cut edge faces of the glass sheet to the accessible general face of the glass sheet and close to the end face of the glass sheet, in particular at most 5 mm from the end face, and preferably at most 1 mm from the end face, so as to position the spacer along one side of the glass sheet, holding the spacer in place temporarily (for example using clamps), applying a transparent adhesive-bonding material to the external joint of the spacer and of the glass sheet, placing the other glass sheet against the other cut edge face of the spacer and parallelly and perfectly facing the first glass sheet, and applying the transparent adhesive-bonding material to the external joint of the spacer and of the second glass sheet.

According to another feature, the glazing is a double glazing or triple glazing.

The glazing may advantageously be provided, on its glass sheets, with one or more low-E coatings and/or an antifog or anti-frost layer, thus avoiding conventional heating means, this helping to save energy.

Lastly, the invention relates, on the one hand, to a door comprising a glazing according to the invention, and on the other hand, to a climate-controlled unit, of the refrigerated-unit type, comprising at least one door or one glazing according to the invention, or a plurality of glazings that are placed vertically side-by-side, the one or more transparent spacers being placed vertically in the mounted position of the one or more glazings.

The present invention is now described using merely illustrative and non-limiting examples of the scope of the invention, and with regard to the appended drawings, in which.

The figures are not to scale for the sake of readability.

Figure 1:
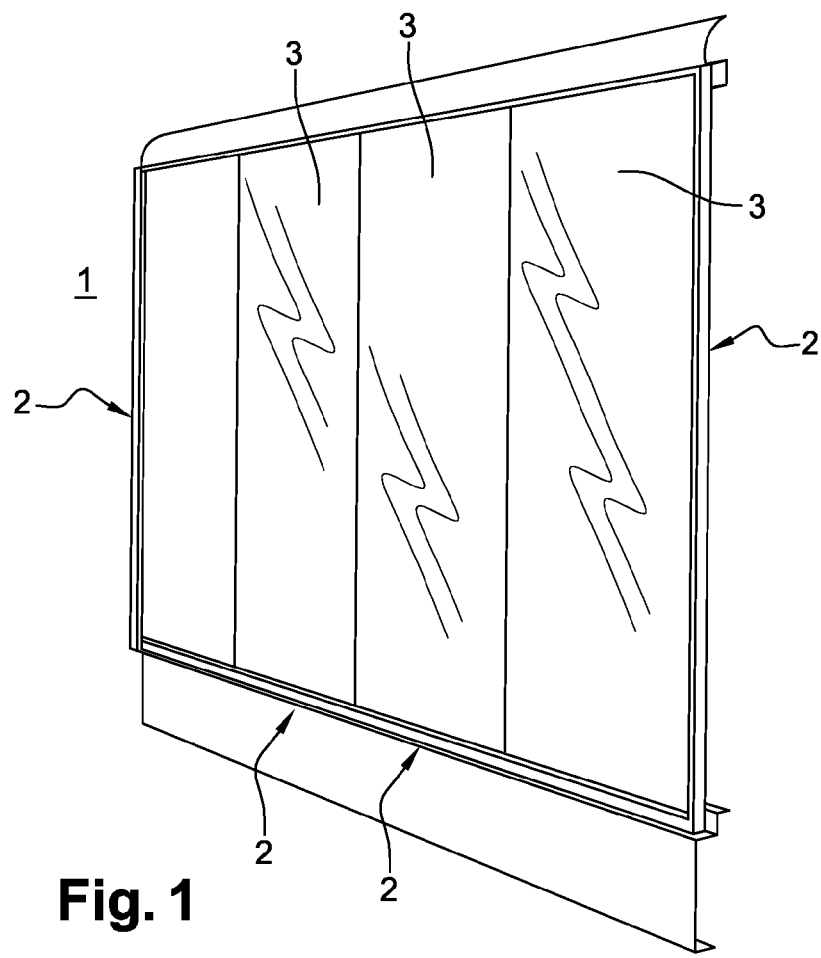
FIG. 1 illustrates a schematic perspective view of a front of a refrigerated unit incorporating a plurality of glazings according to the invention.

The climate-controlled unit 1 schematically illustrated in FIG. 1 comprises a plurality of doors 2 each comprising an insulating glazing 3 according to the invention.

The unit is for example a refrigerated chiller unit (temperature above 0° C.) intended to be installed in a store aisle. It is thus possible, according to the invention, to form a unit with a row of doors that are laterally side-by-side vertically along their edge faces.

In the case of a chiller unit/window, since seal-tightness is less critical than for a freezer unit (temperature below 0° C.), the door according to the invention, which comprises the insulating glazing according to the invention, has no need to comprise vertical jambs forming a frame and provided with thick seals at the junction of two side-by-side glazings/doors. The glazing according to the invention thus allows, because of the transparency of its vertical edges, a continuous transparent area to be achieved when glazings are placed side by side via their edge faces.

Each insulating glazing comprises at least two glass sheets that are held parallel and spaced apart by a frame the opposite vertical portions of which, in the mounted position of the glazing, are transparent.

The front of the glazings and therefore of the unit is thus devoid of any structural frame and has a smooth glass-wall-like appearance. In this way vision area is increased.

Only the transparent vertical portion of the frame of the glazing, i.e. the portion corresponding to the invention, will be described below, the horizontal portions generally being formed by conventional interlayer means and sealing means that are not transparent. Likewise, the door that incorporates the glazing, the hinging means, the profiles for supporting and hiding the hinging means, and the type of handle will not be described.

Figure 2:
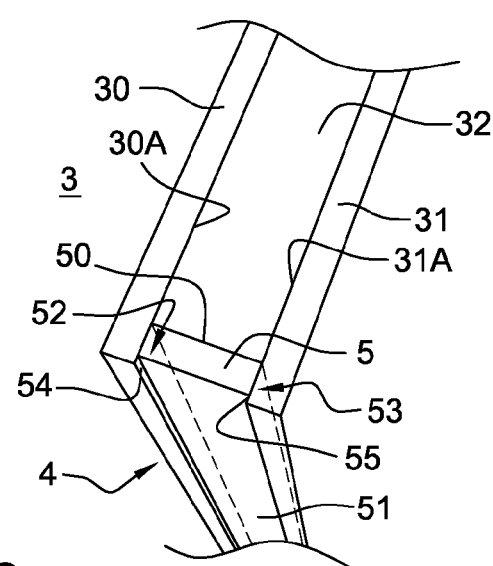
FIG. 2 is a partial perspective view of a glazing according to the invention.

FIG. 2 illustrates a partial perspective view of the insulated glazing 3 showing the transparent vertical interior portion 4 of the frame. The insulating glazing illustrated is a double glazing with two glass sheets. In the case of a triple glazing with three glass sheets, the glazing would comprise two transparent portions 4 according to the invention.

The glazing 3 comprises two glass sheets 30 and 31 that are parallel and spaced apart by means of an interlayer element or spacer 5.

The glass sheets 30 and 31 are preferably made of tempered glass. The thickness of each of the glass sheets is comprised between 2 and 5 mm, and is preferably 3 or 4 mm in order to minimize the overall weight of the glazing and to optimize the transmission of light.

The glass sheets are separated from each other by the spacer 5 in order to produce, therebetween, a volume forming a gas-filled cavity 32.

The gas-filled cavity 32 has a thickness of at least 4 mm and is modified depending on the desired performance in terms of the heat-transfer value U, but is no thicker than 16 mm, or even than 20 mm.

The gas-filled cavity is filled with air or, preferably, in order to increase the level of insulation of the glazing, a rare gas, chosen from argon, krypton, xenon, or a mixture of these various gases, the rare gas making up at least 85% of the gas mixture filling the cavity. For an even further improved U value, it is preferable for the cavity to be filled with a gas mixture containing at least 92% krypton or xenon.

The spacer 5 is entirely made of glass.

The spacer 5 is of generally parallelepipedal shape and has four faces, a face called the internal face 50 facing the gas-filled cavity, an external opposite face 51 facing the exterior of the glazing, and two what are called fastening faces 52 and 53 facing the respective glass sheets 30 and 31.

The spacer 5 extends lengthwise (here not shown) over the entire length of each of at least the vertical sides of the glazing for the targeted refrigerated-unit application.

The spacer has a width (dimension transverse to the general faces of the glass sheets) equivalent to the desired spacing of the glass sheets.

According to the invention, the spacer 5 has a thickness (distance separating the internal face 50 and the external face 51) which is smaller than 8 or 10 mm, and preferably equal to the thickness of a conventional insulating-glazing glass sheet, i.e. to 4 or 6 mm.

The spacer 5 is fastened, by adhesive bonding, via its external junction lines 54 and 55 connecting the fastening faces 52 and 53 and the respective internal faces 30A and 31A of the glass sheets 30 and 31.

According to the invention, the spacer made of glass is obtained by cutting glass, in particular float glass serving to manufacture the glass sheets of a glazing.

Preferably, the cutting of the spacer is made using the scoring-breakage technique. This upstream step of the process for manufacturing the insulating glazing according to the invention may advantageously be carried out under the same conditions as those used to cut the glass sheets.

Figure 3:
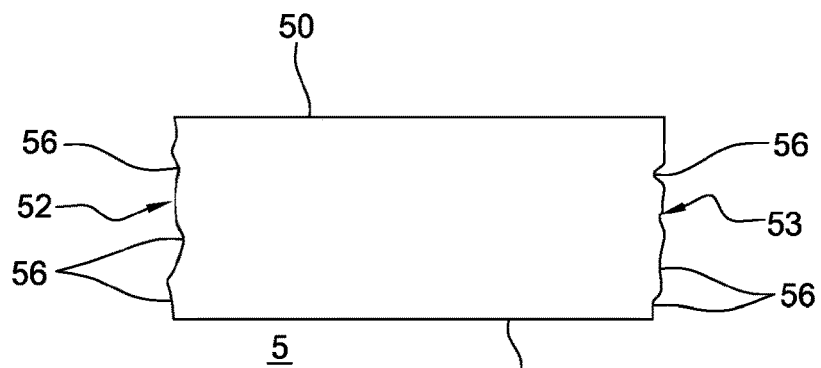
FIG. 3 is a cross-sectional view of a spacer according to the invention.

The spacer illustrated in FIG. 3 has a thickness of 4 mm, equal to that of the glass sheets 30 and 31. The spacer is obtained from float glass; its perfectly parallel opposite faces will correspond to the internal face 50 and the external face 51 in the joined position of the spacer, whereas the cut edge faces of the glass will correspond to the fastening faces 53 and 54.

Because of the cutting technique, the edge faces 52 and 53 are not perfectly planar as illustrated in FIG. 3, but have planarity defects usually called chips, with asperities 56 that are amplified in the figure for the sake of understandability. The asperities have very small dimensions, of about 0.5 mm, or even less.

According to the invention, the spacer is joined to the glass sheets in the raw state after cutting, such as illustrated in FIG. 3, without any polishing-type step of finishing said edge faces.

Figure 4:
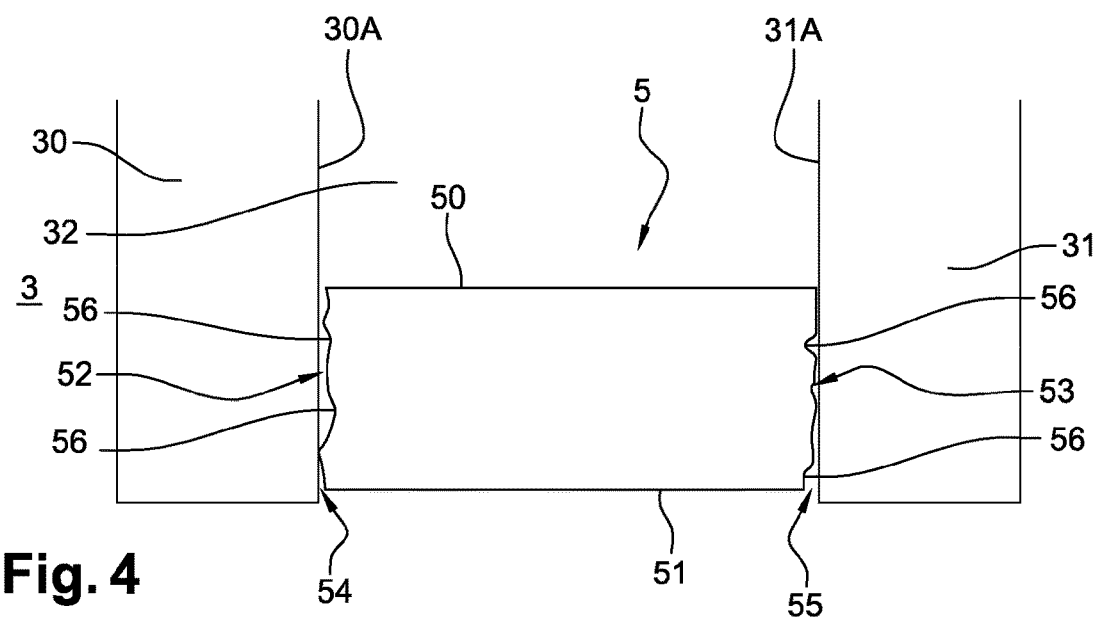
FIG. 4 is a partial cross-sectional view of the glazing according to the invention with the spacer of FIG. 3 and without the presence of adhesive-bonding means.

FIG. 4 is a schematic cross-sectional view of the glazing according to the invention with the spacer of FIG. 3 but without the presence of the adhesive-bonding means, in order to make it possible to more easily see the planarity defects of the spacer and that the surface of the fastening faces is not perfectly smooth and parallel to each of the internal faces 30A and 31A of the glass sheets.

Figure 5:
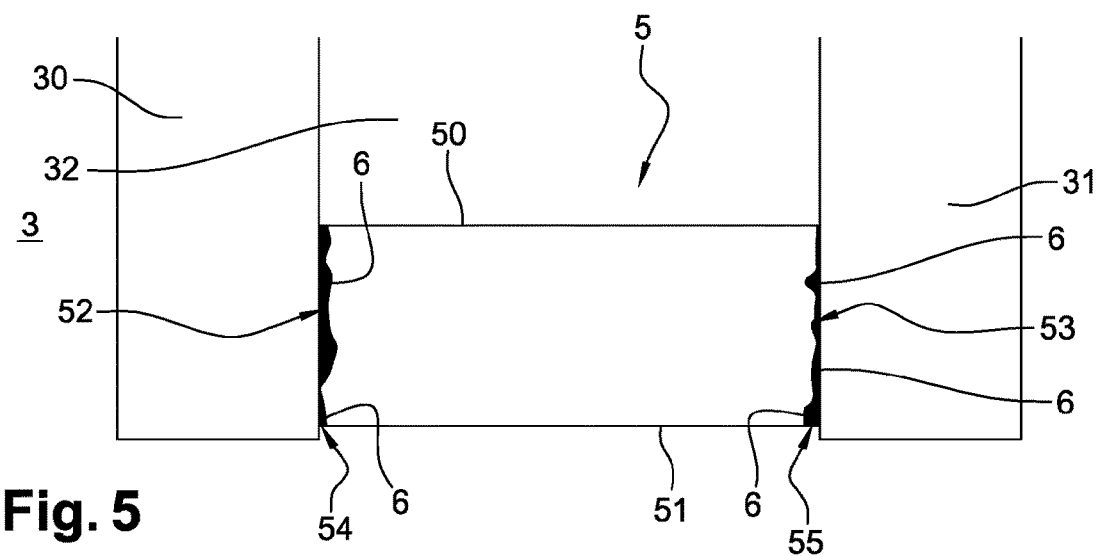
FIG. 5 shows the view of FIG. 4 with the adhesive-bonding means, and thus the glazing according to the invention.

According to the invention, the adhesive-bonding means 6 illustrated in FIG. 5 are such that they are found on the joint lines 54 and 55 of the external face of the spacer and of the glass sheets, and in the asperities 56 of the fastening faces 52 and 53 of the spacer.

The adhesive-bonding means 6 are made of a material that is able to flow during its deposition on the glass. In particular, the material possesses a viscosity comprised between 300 mPa·s and 900 mPa·s.

Thus, the thickness of material placed on the joint lines 54 and 55 is minimized, in particular does not exceed 1 mm, and preferably does not exceed 0.5 mm, on the faces of the glass sheets on said joint lines. Furthermore, the material is arranged at the interface of the fastening faces 53 and 54 and of the faces 30A and 31A of the glass sheets, thereby filling the asperities 56, so as to produce an extremely thin adhesive-bonding coating that is almost imperceptible to the naked eye.

The material of the adhesive-bonding means 6 is a transparent adhesive-bonding material having a refractive index identical or close to that of the glass.

The material is able to rapidly crosslink. It for example crosslinks under ultraviolet.

The material of the adhesive-bonding means is a material possessing properties that make it seal-tight at least to water, and preferably to water and to gases and water vapor, and in particular is an acrylate resin or epoxy resin.

One (completely nonlimiting) adhesive-bonding material that exemplifies the invention and that combines all the above properties is an acrylic resin, the adhesive UV Verifix B 678 sold by the company BOHLE.

The process for manufacturing the glazing of the invention is the following with respect to the manufacture of the spacer and the joining thereof:

- a plurality of strips of glass are cut from a glass substrate of 4 or 6 mm thickness using the scoring-breakage techniques, the glass strips corresponding to the width of separation of the glass sheets of the glazing;
- preferably, each glass strip is cut transversely at its ends, i.e. at the beginning and end of the cut length of the strips;
- a strip is cut transversely to the length desired for the spacer, the length corresponding to the length of one side of the glazing;
- a first glass sheet is placed flat;
- the spacer is arranged on the internal face of the glass sheet via one of the longitudinal cut edge faces of the glass strip;
- the spacer is held temporarily, for example with a clamp;
- adhesive-bonding means are deposited on the joint line of the spacer and of the glass sheet on the external side of the spacer, the adhesive-bonding means then flowing into the asperities;
- the adhesive is dried, for example using ultraviolet if the adhesive-bonding means are crosslinkable under ultraviolet;
- the second glass sheet is arranged perfectly facing and parallel to the first glass sheet, on the second cut edge face of the spacer;
- the glass sheet is held temporarily, for example with clamps;
- adhesive-bonding means are deposited on the joint line of the spacer and of the second glass sheet on the external side of the spacer, the adhesive-bonding means then flowing into the asperities;
- the adhesive is dried; and
- the means for temporarily holding are removed.

Therefore, the process according to the invention is simple to implement and uses the technique conventionally used to cut glass that is not very thick, and the spacer according to the invention thus produced in the raw state, combined with the adhesive-bonding means, allows an insulating glazing to be produced the spacer of which is transparent and of very small thickness, with adhesive-bonding means that are imperceptible to the naked eye, thereby not interfering with the transparent visual impression that the entire glazing must give.

The invention claimed is:

1. An insulating glazing comprising at least two glass sheets, which are spaced apart by at least one air- or gas-filled cavity, at least one transparent spacer made of glass, which is arranged at a periphery of the glass sheets and which keeps the at least two glass sheets spaced apart, and a transparent fastening system to fasten by adhesive bonding, which fastens the spacer to each glass sheet via two opposite fastening faces of the spacer, wherein the spacer made of glass is obtained by the cutting of float glass sheet in a raw state, the cutting having been made using, a scoring-breakage or laser technique and the spacer having a. thickness smaller than 10 mm, and wherein the spacer is joined to the at least two glass sheets between the at least two glass sheets via cut edge fixes of the spacer and joined directly in the raw state after the cutting without any step of finishing said edge faces, and wherein the fastening system to fasten by adhesive bonding consist of a transparent material having been placed at an external junction of the spacer and of the at least two glass sheets and having flowed into asperities of the glass of the fastening faces of the spacer created in the cut edge faces in the raw state as a result of the cutting.

2. The glazing as claimed in claim 1, wherein the thickness of the spacer is the same as that of the at least two glass sheets of the glazing.

3. The glazing as claimed in claim l, wherein the fastening system to fasten by adhesive bonding consists of a transparent adhesive-bonding material having a refractive index identical or close to that of the glass.

4. The glazing as claimed in claim 1, wherein the fastening system to fasten by adhesive bonding consists of a transparent adhesive-bonding material that optionally crosslinks under ultraviolet light.

5. The glazing as claimed in claim 1, wherein the fastening system to fasten by adhesive bonding consists of a transparent material chosen to also form a barrier that is seal-tight at least to water.

6. The glazing as claimed in claim 1, wherein the fastening system to fasten by adhesive bonding has a thickness on an external joint line of the spacer and of each glass sheet of a few microns to 1 mm.

7. The glazing unit as claimed in claim 1, wherein the glazing is a double glazing or a triple glazing.

8. A door comprising a glazing as claimed in claim 1.

9. A climate-controlled unit comprising at least one door as claimed in claim 8, the spacer being placed vertically in a mounted position of the glazing.

10. A process for manufacturing an insulating glazing as claimed in claim 1, comprising a step of producing the spacer and a step of joining the spacer to the at least two glass sheets, wherein the producing step consists in cutting at least one glass strip of width equivalent to that required to separate the at least two glass sheets, from a glass substrate of thickness smaller than 10 mm and using the scoring-breakage or laser technique, and associating the glass strip, via cut edge faces of the spacer, with the at least two glass sheets by joining the glass strip directly in the raw state after the cutting without any step of finishing said edge faces and placing the glass strip between the at least two glass sheets, with adhesive-bonding a material of which is able to flow into an interface between said cut edge faces of the spacer and the at least two glass sheets, and into the asperities of the glass of the cut edge faces created therein in the raw state as a result of the cutting.

11. The process as claimed in claim 10, wherein the producing step comprises cutting a plurality of glass strips.

12. The process as claimed in claim 10, wherein the joining step comprises placing a glass sheet flat, placing the spacer along one side of the glass sheet by applying one of the cut edge faces of the glass strip to an accessible general face of the glass sheet and close to the edge of the glass sheet, holding the spacer in place temporarily, applying a transparent adhesive-bonding material to the external joint of the spacer and of the glass sheet, placing the other glass sheet against the other cut edge face of the spacer and parallelly and perfectly facing the first glass sheet, and applying the transparent adhesive-bonding material to the external joint of the spacer and of the second glass sheet.

13. The glazing as claimed in claim 1, wherein the spacer made of glass has a thickness smaller than 8 mm.

14. The glazing as claimed in claim 13, wherein the spacer made of glass has a thickness comprised between 4 and 6 mm.

15. The glazing as claimed in claim 5, wherein the barrier is seal tight to water and to gases and water vapor.

16. The glazing as claimed in claim 5, wherein the transparent material is made of an acrylate resin or epoxy resin.

17. The glazing as claimed in claim 6, wherein the thickness is of a few microns to 0.5 mm at most.

18. The glazing unit as claimed in claim 7, wherein the glazing is provided with one or more low-E coatings and/or an anti-fog or anti-frost layer.

19. A climate-controlled unit comprising a plurality of glazings as claimed in claim 1, the transparent spacers associated with the plurality of glazings being placed vertically in a mounted position of the glazings.

20. The process as claimed in claim 12, wherein the spacer is placed at most 5 mm from the edge of the glass sheet.

21. The process as claimed in claim 20, wherein the spacer is placed at most 1 mm from the edge of the glass sheet.

* * * * *